United States Patent Office 3,708,328
Patented Jan. 2, 1973

3,708,328
FIRE-PROOFING OF POLYESTER FIBERS
Wilhelm Loffler Kelkheim, Taunus, and Martin Rieber, Schonberg, Taunus, Germany, assignors to Farbwerke Hoechst Aktiengesellschaft vormals Meister Lucius & Bruning, Frankfurt am Main, Germany
No Drawing. Filed Feb. 12, 1971, Ser. No. 115,066
Claims priority, application Germany, Feb. 14, 1970,
P 20 06 899.9
Int. Cl. B44d 1/50
U.S. Cl. 117—93.31        13 Claims

ABSTRACT OF THE DISCLOSURE

Linear polyesters are rendered flame-proof by contacting them with phosphoric acid-allyl-2,3-dibromopropyl esters and polymerizing said esters on the substrate by a heat treatment, optionally with the aid of a free radical generator.

---

The present invention relates to a process for rendering fibrous materials and foils consisting of linear polyesters flame-proof. A further object of this invention are the products of said process, a composition of matter consisting essentially of a linear polyester, a polymeric phosphoric acid allyl ester and of a linear polyester containing lateral chains deriving from phosphoric acid allyl esters. The most important example for the last-mentioned component of said composition is, more specifically, a polymer chain having recurring units of the formula

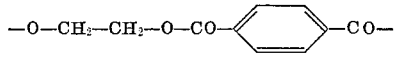

which chain contains to some extent lateral chains of the formula

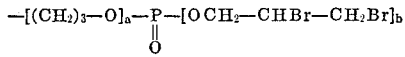

in which $a$ and $b$ are 1 or 2, the sum of $a$ and $b$ being 3, which lateral chains are distributed statistically over the polyester chain.

It is known that some phosphorus- and bromine-containing compounds have a flame-proofing effect when applied to synthetic fibers. However, the number of the hitherto known substances which may be used for fire-proofing polyester fibers is limited. As a compound suitable for this purpose, phosphoric acid-tris-2,3-dibromo-propyl ester has already been proposed. Thus, Belgian Pat. No. 699,765 describes a process for the fire-proofing of synthetic fibers, wherein phosphoric acid-tris-2,3-di-bromo-propyl ester is fixed onto the fibrous material with the aid of a binder system, for example a copolymer of styrene and maleic acid anhydride.

In general, the hitherto known processes for the fire-proofing of polyester fibers give finishes which are not resistant to washing treatments. However, for many purposes the resistance to washing of such finishes is very desirable. In addition to the insufficient resistance to washing, the conventional finishing processes involve the further disadvantage that the goods often have imparted thereto a disagreeable odour. Furthermore, almost all fire-proofing finishes affect unfavourably the handle of the textile materials. Most of the finishes impart a stiff and hard handle onto the goods. Furthermore, the products hitherto used often require application of a very strong layer for producing a sufficient fire-proofing effect.

Now, we have found that the afore-described disadvantages of the known processes can be by-passed and that fibrous materials and foils of linear polyesters can be provided with a permanent, fire-proofing finish by applying onto these fibrous materials or foils phosphoric acid-allyl-bis-2,3-dibromo-propyl ester or, preferably, phosphoric acid-diallyl-2,3-dibromo-propyl ester and polymerizing them by means of heat and, if desired or required, of a polymerization initiator.

In the process of the invention, the compounds phosphoric acid - allyl - bis - 2,3 - dibromo - propyl ester or phosphoric acid - diallyl - 2,3 - dibromo - propyl ester, which have a fire-proofing effect, or a mixture of these two compounds, can be applied in bulk, as solution in an organic solvent or as aqueous emulsion onto the substrate. As solvents for the compounds which have the fire-proofing effect, there may be used above all chloro-hydrocarbons, especially tetrachloro-ethane, perchloro-ethylene, trichloro-ethylene, methylene chloride, as well as fluoro-chloro-hydrocarbons or dimethylformamide. However, the solvents mentioned are given here by way of example only and shall in this respect represent no limitation. The compounds having a fire-proofing effect or the solutions or suspensions thereof may be applied onto the substrates to be finished, in any desired manner, for example by immersion, padding or spraying.

The polymerization of the monomers on the fibres, on the products made thereof or on foils is effected by the action of heat at temperatures in the range of above 30° C., suitably in the range of from about 50 to 220° C.; it is preferred to use temperatures in the range of from 80 to 180° C. The duration of the heat treatment depends above all on the temperature degree used. In general, it ranges from about 15 seconds to 24 hours; preferably, however, the temperature used is so adjusted to give a heating period of from about 1 minute to about 5 hours.

In order to promote the polymerization reaction of the monomers, it is suitable to add polymerization initiators. These initiators may be substances which split off radicals or they may be ozone or ionizing irradiation. A simple method consists in adding to the monomers or to the solution or emulsion of the monomers immediately before application substances which split off radicals.

As substances which split off radicals, the compounds known for this purpose may be used; by way of example there are mentioned benzoyl peroxide, tert. butyl-per-benzoate, tert. butyl-per-isononanoate, dicumyl-peroxide, 1,3 - bis - (tert.-butyl-peroxy-isopropyl)-benzene, acetyl-peroxide and azo-diisobutyronitrile.

The compounds which split off radicals may be applied onto the substrate before application of the monomers. Here, too, it is possible to apply the initiators in bulk, in solution or in emulsified form. As solvents, easily volatile compounds such as benzene, ethanol, acetone, trichloro-ethylene, 1,1,1-trichloroethane or, preferably methylene chloride may be used.

For effecting the polymerization as indicated above, the goods are heated when the monomers have been applied. In order to be able to operate at a low temperature and within a short period of time, accelerators may be added to the polymerization initiators. As such, for example cobalt octoate, dimethyl-aniline, dimethyl-p-toluidine or diethyl-aniline may be used. The accelerators may be added to the monomers or they may be applied before application of the latter directly onto the substrate, solely or together with the polymerization initiators. The monomers may also be combined with small amounts of inhibitors, for example hydroquinone or other phenol derivatives.

When ozone is used as the polymerization initiator, the substrate to be finished is suitably treated with ozone for about 3 minutes to 2 hours, before application of the monomers, at temperatures in the range of from about 0 to about 100° C., preferably at 20–60° C. In general, this treatment is effected by passing over a stream of oxygen containing about 0.2 to 30% by volume, preferably 3 to 5% by volume of ozone. However, the ozone may also be applied from an aqueous or weakly acidic solution. After this preliminary treatment, the monomers are applied onto the substrates and polymerized there by subsequent heating to temperatures of abve 30° C.

For initiating the polymerization, also energy-rich/ionizing irradiation by electron or gamma rays, preferably ultraviolet irradiation, may be used. The irradiation may be effected in various ways, either according to the pre-irradiation technique or according to the simultaneous irradiation technique. In the case of the pre-irradiation technique, the substrate is irradiated with said rays in the presence of air or oxygen, the monomers are then applied and then heating is effected, preferably in the absence of oxygen, in order to permit polymerization to proceed. In the case of the pre-irradiation technique, an irradiation dose in the range of from about 0.5 to 15 mrad is generally required.

When using the technique of simultaneous irradiation, the substrate provided with the monomer is subjected to irradiation, preferably under exclusion of air. The heat treatment can be carried out either during and/or after the irradiation. When working with gamma rays, it is best to heat during irradiation. When electron rays are used, however, it is suitable to heat either after or during irradiation. In the case of the technique using simultaneous irradiation, irradiation doses in the range of from about 0.1 to 10 mrad are generally sufficient to provoke sufficient initiation of the polymerization.

When the polymerization is completed, any unreacted monomers still present on the substrate and any still adhering solvents can be removed by a heat treatment and/or by a washing treatment.

On fibrous materials and foils, excellent permanent flame-proof finishes are produced by the process of the invention. At the same time the handle of fibrous materials is surprisingly improved. Furthermore, it is surprising that by grafting on very small amounts of monomers, onto the polyester substrates, for example by fixing by polymerization only about 4% by weight of phosphoric acid-dially-2,3-dibromo-propyl ester, to polyester fibrous materials, a good flame-proofing effect is obtained which also meets the requirements set forth in DIN 53,906 (German Industrial Standard). In many cases, also smaller percentage quantities of active substance are sufficient. Even low quantities considerably reduce the inflammability. The improvement of the handle of the polyester fibrous materials finished according to the invention consists in that the materials so finished have imparted thereto a silk-like scroop and a silk-like appearance. The hardening of the handle of the goods observed after the conventional fire-proofing finishings practically does not occur with the finish produced according to the invention.

The layers applied according to the process of the invention are in the range of about 0.5 to about 20% by weight, preferably about 3 to about 10%. Thereof, a greater or smaller amount is bound chemically to the polyester molecule, depending on the method of operation and the manner of producing the radicals. Especially when the substrate to be finished is treated with energy-rich irradiation, a considerable proportion of the phosphoric acid ester is bound via the allyl group in the polymer by a covalent linkage, while the lateral chains so obtained are essentially distributed statistically over the whole polyester chain. In the case of the diallyl esters, also crosslinking by interlinkage of various polyester chains may be caused thereby.

Another important advantage of the finish produced according to the present invention is also that it is practically odourless, in contradistinction to many other known fire-proofing finishes. Accordingly, the finish of the invention can not only be used on coarse fabrics intended for industrial purposes, for example for tents or awnings, but also for clothing textiles such as work clothes, children's clothes, night garments and bed clothes. In the same manner, household textiles such as carpets, base fabrics for carpets, felt floor coverings may be finished therewith. Furthermore, unprocessed, even previously dyed polyester filaments, fibers or yarns can in this manner be provided with a fire-proof finish.

The test for inflammability described in the following examples was carried out according to DIN 53,906 (German Industrial Standard), which corresponds to the requirements set forth in U.S. CLC D 5,902/1913, Method B.

The substrate consisted in every case of polyethylene glycol terephthalate in different processing forms.

The following examples illustrate the invention:

EXAMPLE 1

10 g. of a polyethylene terephthalate fabric were impregnated with a solution consisting of 3 g. of phosphoric acid-diallyl-2,3-dibromo-propyl ester,
1.5 g. of tetrachloro-ethane, and
100 mg. of benzoyl peroxide.

The specimen was heated under nitrogen for 4 hours at 120° C. in a closed glass vessel. For removing the solvent, the fabric was after-treated for 1 minute at 160° C. and for removing unreacted monomer it was washed once in a household washing machine at 40° C. It was then dried at 60° C. in a tumbler. The weight increase of the fabric caused by the phosphoric acid diallyl-2,3-dibromo-propyl ester fixed thereon by polymerization was 5.3%. The fabric so finished showed excellent fire-proofing properties which withstood, practically without any change even several washings.

For testing the inflammability according to DIN 53,906, using a threefold layer of the so finished fabric, the specimen did not burn after removal of the flame, whereas the untreated specimen tested in the same manner completely burned down within about 40 seconds after removal of the ignition flame.

A specimen of the fabric so finished having a size of 10 x 20 cm., folded twice, when held into the flame of a Bunsen burner, burned as long as the flame was turned on it, but did not continue to burn after removal from the Bunsen flame.

EXAMPLE 2

10 g. of a polyethylene terephthalate fabric were provided with a finish as described in Example 1, with the difference, however, that 4 hours heat treatment at 120° C. was not carried out under nitrogen but in the presence of air. The weight increase was here 5%.

The test for the inflammability according to DIN 53,906 after 6 washing treatments at 40° C., gave the same results as those described in Example 1.

EXAMPLE 3

10 g. of a polyethylene terephthalate twill fabric were impregnated with a solution consisting of 2.5 g. of phosphoric acid-diallyl-2,3-dibromo-propyl ester,
2.0 g. of tetrachloroethane, and
100 mg. of benzoyl peroxide.

The sample was then heated for 2 hours at 120° C. in a closed vessel and for 1 minute at 160° C. in a drying cabinet in order to remove the solvent. The unreacted monomers were removed by a washing treatment at 40° C. in a household washing machine. The weight increase was 4.5%.

The specimen was found to be very difficult to ignite in accordance with DIN 53,906. Even after several washing treatments at boiling temperature, the specimen was still difficult to inflame.

EXAMPLE 4

A specimen of 10 g. of a polyethylene terephthalate twill fabric was impregnated with a solution consisting of 2.5 g. of phosphoric acid-diallyl-2,3-dibromo-propyl ester and 2.0 g. of tetrachloroethane and further treated as described in Example 3.

The fabric which showed a weight increase of 3.8% by the finish was likewise difficult to inflame in accordance with the requirements of DIN 53,906.

EXAMPLE 5

10 g. of a polyethylene terephthalate fabric were impregnated with a solution consisting of 2 g. of phosphoric acid diallyl-2,3-dibromo-propyl ester,
0.5 g. of phosphoric acid-allyl-bis-2,3-dibromo-propyl ester,
0.5 g. of tetrachloroethane, and
1 g. of perchloroethylene.

The specimen was irradiated under nitrogen in a glass vessel at 80° C. with a dose of 1 mrad of gamma rays. Irradiation was carried out for 5 hours. The removal of the solvents was effected in a drying cabinet at 160° C. for 1 minute and the removal of unreacted monomer was effected by a washing treatment in a household washing machine at 40° C. The finish imparted onto the fabric a weight increase of 5.5%. The specimen was difficult to inflame even after 5 washing treatments at boiling temperature.

EXAMPLE 6

5 g. of a solution of 2% by weight of benzoyl-peroxide in methylene chloride were sprayed onto a specimen of 10 g. of a polyethylene terephthalate fabric. After the solvent had evaporated in the air, a solution consisting of 3.0 g. of phosphoric acid diallyl-2,3-dibromo-propyl ester, and
2.0 g. of perchloroethylene was sprayed on and the specimen was heated for 4 hours in a glass vessel to 110° C. The solvent was then removed by treating the specimen in a drying cabinet for 1 minute at 160° C. and the unreacted monomer was removed by a washing treatment at 40° C. in a household washing machine. The weight increase was 6%. The goods so obtained showed a fireproof finish which prevented flaming even after 10 washing treatments at 40° C., when tested according to DIN 53,906.

We claim:

1. A process for rendering flame-proof substrates which are fibrous materials and foils consisting of linear polyesters, which comprises contacting said substrates with an ester selected from the group consisting of phosphoric acid diallyl-2,3-dibromopropyl ester, phosphoric acid allyl bis-(2,3-dibromopropyl)ester and mixtures thereof polymerizing said ester on the substrate by a heat treatment.

2. The process as claimed in claim 1, wherein a solu-strate consists of polyethyleneglycol terephthalate.

3. The process as claimed in claim 1, wherein a solution or an aqueous emulsion or dispersion of said ester is used.

4. The process as claimed in claim 1, wherein a free-radical initiator is used to cause the polymerization of said ester.

5. The process as claimed in claim 1, wherein the polymerization of said ester is effected with the aid of a free radical generator selected from the group consisting of free radicals generating organic or inorganic substances, ozone, UV or ionizing high energy irradiation.

6. The process as claimed in claim 1, wherein the temperature range of the heat treatment is above 30° C.

7. The process as claimed in claim 1, wherein the temperature range of the heat treatment is of about 50 to about 220° C.

8. The process as claimed in claim 1, wherein a free-radical generating substance is added onto the substrate before or during the contacting of said ester with the substrate.

9. The process as claimed in claim 1, wherein the substrate is subjected to an ozone treatment before contacting it with said ester.

10. The process as claimed in claim 1, wherein UV or ionizing high energy irradiation is allowed to act onto the substrate before, during or after the contacting of the substrate with said ester.

11. A composition of matter consisting essentially of
(a) polyethyleneglycol terephthalate,
(b) a polymeric allyl ester deriving from phosphoric acid-allyl-bis-(2,3-dibromopropyl)-ester, phosphoric acid-diallyl-2,3 - dibromopropyl ester or mixture thereof and
(c) a polyethyleneglycol terephthalate containing in the polymer chain lateral groups of the formula

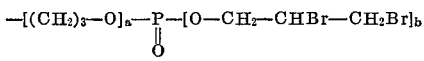

in which $a$ and $b$ are 1 or 2, the sum of $a$ and $b$ being 3.

12. A modified polyethyleneglycol terephthalate consisting of a polymeric chain of recurring units of the formula

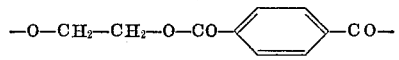

said chain having statistically distributed lateral groups of the formula

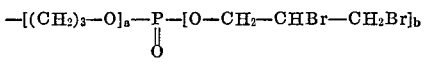

in which $a$ and $b$ are 1 or 2, the sum of $a$ and $b$ being 3, which lateral groups amount to about 0.5 to about 20% of the total weight.

13. A process for rendering flame-proof substrates which are fibrous materials and foils consisting of linear polyesters, which comprises contacting said substrates with a solvent solution of an ester selected from the group consisting of phosphoric acid diallyl-2,3-dibromopropyl ester, phosphoric acid allyl bis-(2,3-dibromopropyl)ester and mixtures thereof, said esters being dissolved in a solvent selected from tetrachloroethane, perchloroethylene and mixtures thereof, and polymerizing said ester on the substrate by a heat treatment.

References Cited

UNITED STATES PATENTS

| | | | |
|---|---|---|---|
| 3,088,791 | 5/1963 | Cline et al. | 117—93.31 |
| 3,591,664 | 7/1971 | Kodama et al. | 260—956 |
| 3,607,745 | 9/1971 | Di Pietro | 117—136 |
| 3,507,688 | 4/1970 | Carl et al. | 117—136 |
| 3,372,176 | 3/1968 | Roselli | 260—956 |

RALPH S. KENDALL, Primary Examiner

J. H. NEWSOME, Assistant Examiner

U.S. Cl. X.R.

8—115.5, DIG 15; 117—136, 161 R; 204—159.15; 260—956